United States Patent
Sioson et al.

(10) Patent No.: US 11,307,818 B2
(45) Date of Patent: Apr. 19, 2022

(54) SYSTEM AND METHOD FOR REPRINTABLE ITEMS

(71) Applicant: CCL LABEL, INC., Framingham, MA (US)

(72) Inventors: Randy Sioson, Framingham, MA (US); Phillip Mcgee, Chino Hills, CA (US); Colwin Chan, Framingham, MA (US)

(73) Assignee: CCL Label, Inc., Framingham, MA (US)

( * ) Notice: Subject to any disclaimer, the term of this patent is extended or adjusted under 35 U.S.C. 154(b) by 0 days.

(21) Appl. No.: 17/267,129

(22) PCT Filed: Mar. 13, 2019

(86) PCT No.: PCT/US2019/051043
§ 371 (c)(1),
(2) Date: Feb. 9, 2021

(87) PCT Pub. No.: WO2020/056282
PCT Pub. Date: Mar. 19, 2020

(65) Prior Publication Data
US 2021/0357165 A1    Nov. 18, 2021

Related U.S. Application Data

(60) Provisional application No. 62/731,401, filed on Sep. 14, 2018.

(51) Int. Cl.
*G06F 3/12* (2006.01)

(52) U.S. Cl.
CPC .......... *G06F 3/1243* (2013.01); *G06F 3/1205* (2013.01); *G06F 3/1206* (2013.01); *G06F 3/1272* (2013.01)

(58) Field of Classification Search
CPC .... G06F 3/1238; G06F 3/1222; G06F 3/1254; G06F 3/1232; G06F 3/1206; G06F 3/1205; G06F 3/1255; G06F 3/1267
See application file for complete search history.

(56) References Cited

U.S. PATENT DOCUMENTS

| | | | |
|---|---|---|---|
| 6,085,126 A * | 7/2000 | Mellgren, III | G06Q 10/06 700/233 |
| 8,233,184 B2 | 7/2012 | Yamaguchi et al. | |
| 9,415,604 B2 | 8/2016 | Fischer | |
| 2003/0169451 A1* | 9/2003 | Ponce | G06F 40/174 358/1.18 |
| 2012/0038940 A1 | 2/2012 | Boskovic | |

OTHER PUBLICATIONS

Patent Cooperation Treaty (PCT), International Search Report and Written Opinion for Application PCT/US2019/051043 filed Mar. 13, 2019, dated Nov. 26, 2019, International Searching Authority, US.

* cited by examiner

*Primary Examiner* — Iriana Cruz
(74) *Attorney, Agent, or Firm* — McDonald Hopkins LLC

(57) ABSTRACT

A printing system may generate custom user designs for printing. The designs may be associated with a selected print medium. The printing system may generate a custom template for a secondary printing on the print medium. The custom template may define print areas based on the print medium and the custom user design.

19 Claims, 13 Drawing Sheets

FIG. 4

Address & Shipping Label Templates

Showing 1-12 of 275  SORT BY Most Popular ⌄

Categories +

Filter By

Show Only WePrint Products?
○ off

| Type | + |
| Size | + |
| Labels per Sheet | + |
| Sheet Size | + |
| Color | + |

Address Labels
Template 5160
1" x 2-5/8"
White
30 per Sheet
Available in: WePrint

Address Labels
Template 8160
1" x 2-5/8"
White
30 per Sheet
Available in: WePrint

Shipping Labels
Template 5163
2" x 4"
White
10 per Sheet
Available in: WePrint

Shipping Labels
Template 8163
2" x 4"
White
10 per Sheet
Available in: WePrint

Shipping Labels
Template 5164
3-1/3" x 4"
White
6 per Sheet
Available in: WePrint

Return Address Labels
Template 5195
2/3" x 1-3/4"
White
60 per Sheet
Available in: WePrint

SYSTEM AND METHOD FOR REPRINTABLE ITEMS

CROSS-REFERENCE TO RELATED APPLICATIONS

The present application claims priority to and the benefit of U.S. Provisional Patent Application No. 62/731,401 titled "SYSTEM AND METHOD FOR REPRINTABLE ITEMS" filed on Sep. 14, 2018, the disclosure of which is incorporated herein by reference in its entirety.

FIELD OF USE

The present disclosure relates to systems and methods for printing customized items, and, more particularly, to customizable print items and reprint items, as well as creating a template based on a first print design for visual assessment and printing of a second print that correctly aligns with the first print.

BACKGROUND

Network-based custom-printing systems allow a user to access software stored on a server, design a document or other item while connected to the server, and then print the document or item after the design has been completed. Traditional systems either print using a local printer or allow for ordering of professional prints (e.g., digital press fulfillment). If an end user wishes to add additional customizations to items after printing, they may need to use trial and error to find the appropriate print position or they need to create an entirely new project. These systems do not provide sufficient efficiency.

Professional printers have different capabilities and features from local printers and printing on these require very different processes. For example, paper used in such printing devices is often very different; e.g., a local printer may utilize a single 8½ in.×11 in. single sheet whereas the professional printer may utilize a roll or ream of paper or larger sized sheets of paper. Customers may request professional printers to print a custom design.

There is a need for a way to efficiently create and print additional designs on the custom printed product. Therefore, there is a need for a system and method that more efficiently and/or effectively print designs and to print secondary designs on to original designs.

SUMMARY

The following presents a summary of this disclosure to provide a basic understanding of some aspects. This summary is intended to neither identify key or critical elements nor define any limitations of embodiments or claims. Furthermore, this summary may provide a simplified overview of some aspects that may be described in greater detail in other portions of this disclosure.

A printing system and method may generate custom user designs for printing. The designs may be associated with a selected print medium. The printing system may generate a custom template for a secondary printing on the print medium. The custom template may define print areas based on the print medium and the custom user design. The secondary printing may print secondary indicia on the print medium in appropriate areas.

Also described is a printer system comprising a processor coupled to a memory storing computer-executable instructions, the processor executes or facilitates execution of the computer-executable instructions to perform operations comprising generating a customized design as a function of at least a user input and a print-receptive medium for receiving the customized design, wherein the customized design operatively identifies locations for printing first indicia on the print receptive medium during a first printing process, and generating a custom template for a secondary printing process of second indicia based on the customized design, wherein generating the custom template includes identifying the locations of the first indicia associated with the customized design, determining restrictions for locating the second indicia based on the locations for printing the first indicia, and identifying safe print areas for the second indicia based on the determined restrictions. The determined restrictions for locating the second indicia based on the locations for printing the first indicia may comprise identifying bleed areas that define locations in which operative printing of the secondary indicia may result in bleeding of the second indicia into the first indicia. In another aspect, determining the restrictions for locating the second indicia based on the locations for printing the first indicia may comprise identifying bleed areas that define locations in which operative printing of the secondary indicia may result in bleeding of the second indicia into the first indicia. Further, determining the restrictions for locating the second indicia based on the locations for printing the first indicia may comprise identifying bleed areas that define locations in which operative printing of the secondary indicia may result in cutting of the second indicia during the secondary printing process. In some examples, determining the restrictions for locating the second indicia based on the locations for printing the first indicia may comprise determining one or more borders identifying locations in which the second indicia will not be operatively printed on the print receptive medium. The printer system may further comprise operations for receiving input identifying the desired location of the second indicia and comparing the desired location with the safe print area. The printer system may further comprise operations for generating at least one notification in response to determining that the desired location of the second indicia is at least partially not within the safe area. The printer system may further comprise operations for providing a user selectable control to allow a user to modify the desired location in response to the at least one notification. The printer system may further comprise operations for providing a user selectable control to allow a user to proceed with the secondary printing process without the desired location in response to the at least one notification. The at least one notification may comprise instructions for correcting the desired location.

In another example, a method is described. The method may include generating a customized design as a function of at least a user input and a print-receptive medium for receiving the customized design, wherein the customized design operatively identifies locations for printing first indicia on the print receptive medium during a first printing process, printing the customized design on the print receptive medium, generating a custom template for a secondary printing process of second indicia onto the print receptive medium based on at least the customized design, wherein generating the custom template includes: identifying the locations of the first indicia associated with the customized design; determining restrictions for locating the second indicia based on the locations for printing the first indicia; and identifying safe print areas for the second indicia based on the determined restrictions such that the secondary indicia does not interfere with the first indicia when the secondary printing process is executed. The first printing process may be executed prior to the second printing process. The first printing process may be executed via a remote printer and shipped to a user's location. The second printing process may be executed via a user printer. In some examples, the method may comprise storing the custom template and associating the custom template with a user account.

Also described is a printer system comprising a processor coupled to a memory storing computer-executable instructions, the processor executes or facilitates execution of the computer-executable instructions to perform operations comprising, generating a customized design, comprising first indicia and defining locations of the first indicia relative a print receptive medium, safe print areas for receiving second indicia on the print receptive medium, and restricted print areas associated with restricting printing of the second indicia, and generating a first custom template for a secondary printing process of the second indicia for printing on the print receptive medium after operative printing of the customized design, wherein the custom template indicates the safe print areas and the restricted print areas. The operations may further comprise generating a second custom template for a third printing process of third indicia onto the print receptive medium. Defining the locations may comprise defining the location of at least one of the safe print areas or the restricted print areas based on a characteristic of the print receptive medium. It is noted that the characteristic of the print receptive medium comprises at least one of a cut area, number of printable products, or type of card stock. In some examples, the operations may comprise automatically determining a location for the second indicia based at least on the safe print areas and the restricted print areas.

The following description and the drawings disclose various illustrative aspects. Some improvements and novel aspects may be expressly identified, while others may be apparent from the description and drawings.

BRIEF DESCRIPTION OF THE DRAWINGS

The present teachings may be better understood by reference to the following detailed description taken in connection with the following illustrations, wherein:

FIG. 4 is an example interface for designing a project with the system including a template selection interface, in accordance with various described embodiments;

FIG. 8 is an example interface for designing a project with the system including a template selection interface with a custom template, in accordance with various described embodiments;

DETAILED DESCRIPTION

Figure 1:
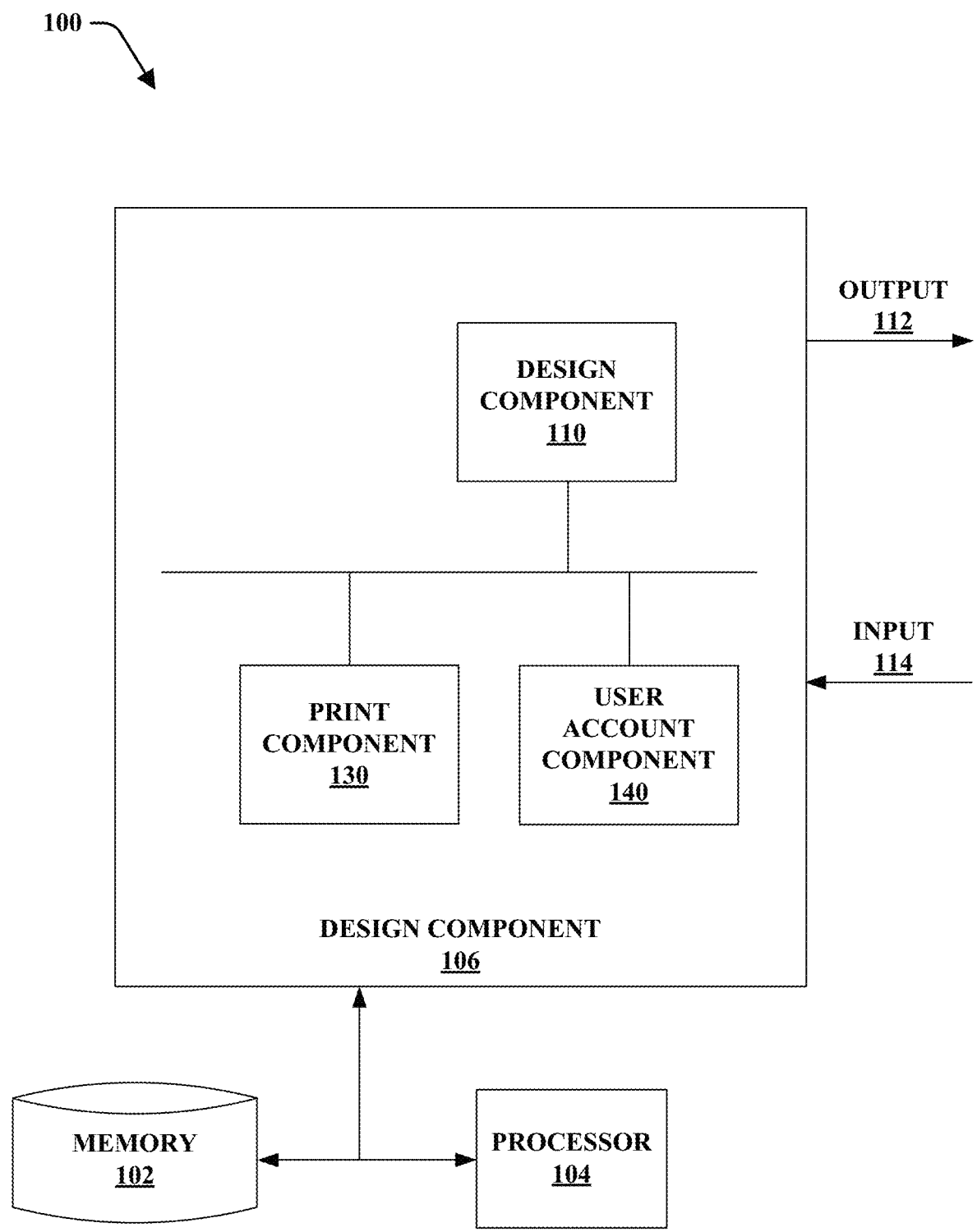
FIG. 1 is a functional block diagram of a printing system, in accordance with various described embodiments.

In the following description of the present teachings, reference is made to the accompanying drawings which form a part thereof, and in which is shown, by way of illustration, exemplary embodiments illustrating the principles of the present teachings and how it may be practiced. It is noted that other embodiments may be utilized to practice the present teachings and structural and functional changes may be made thereto without departing from the scope of the present teachings. For example, the various embodiments may be combined such that features of one may replace corresponding features of another to create a further embodiment. However, for the sake of brevity, not every single combination has been described.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

Moreover, terms such as "access point," "server," and the likes, are utilized interchangeably, and refer to a network component or appliance that sends and receives control data, voice, video, sound, image, text (e.g., including chat room or help desk text, etc.) or other data-stream or signaling-stream. Data and signaling streams may be packetized or frame-based flows. Furthermore, the terms "user," "customer," "consumer," and the like are employed interchangeably throughout the subject specification, unless context suggests otherwise or warrants a particular distinction among the terms. In examples, a "user" may generally refer to an end user. In another aspect, terms such as "operator," "administrator," "provider" and the like are employed interchangeably throughout the subject specification, unless context suggests otherwise or warrants a particular distinction among the terms. "Provider" may refer to a person (or persons) that may provide services (e.g., systems, support, etc.) to the user. It is noted that such terms may refer to human entities or automated components supported through artificial intelligence (e.g., a capacity to make inference).

Moreover, terms such as "personalization," "customization," and the like are employed interchangeably throughout the subject specification, unless context suggests otherwise or warrants a particular distinction among the terms. Such terms may refer to the process of substituting default data (e.g., placeholder art, predetermined data, etc.) with new data (e.g., new art) to suit the particular needs of a user, altering values of data on an interactive form, adding user-generated content, or the like. For instance, a user may alter attributes of a font, may add a name into a "name" field on an interactive form, may replace an image (e.g., a default image, placeholder image, etc.) with a user-generated image, or the like. It is further noted that embodiments may utilize and/or are applicable to customizable items which may not be actually customized, such as pre-created themes or designs that may be offered to and selectable by a user.

It is noted that, terms "user equipment," "device," "user equipment device," "client," and the like are utilized interchangeably in the subject application, unless context warrants particular distinction(s) among the terms. Such terms may refer to a network component(s) or appliance(s) that sends or receives data, video, sound, or substantially any data-stream or signaling-stream to or from network components and/or other devices. By way of example, a user equipment device may comprise an electronic device capable of wirelessly sending and receiving data. A user equipment device may have a processor, a memory, a transceiver, an input, and an output. Examples of such devices include a cellular telephone (e.g., smart phone), personal digital assistant (PDA), portable computer (e.g., laptop computer), tablet computer (tablet), desktop computer, hand-held gaming counsel, wearable (e.g., smart watch), printer (e.g., copy machine, fax machine, smart printer), etc.

"Logic" refers to any information and/or data that may be applied to direct the operation of a processor. Logic may be formed from instruction signals stored in a memory (e.g., a non-transitory memory). In another aspect, logic may include hardware, alone or in combination with software. For instance, logic may include digital and/or analog hardware circuits, such as hardware circuits comprising logical gates (e.g., AND, OR, XOR, NAND, NOR, and other logical operations). Furthermore, logic may be programmed and/or include aspects of various devices and is not limited to a single device. Other terminology and features relative to systems and methods of the present teachings will be described herein, where pertinent. It is noted, however, that these definitions are merely exemplary and that the present teachings are not limited to the aforementioned definitions.

A network typically includes a plurality of elements that host logic. In packet-based wide-area networks (WAN), servers (e.g., devices) may be placed at different points on the network. Servers may communicate with other devices and/or databases. In an aspect, a server may provide access to a user account. The "user account" includes attributes for a particular user and commonly include a unique identifier (ID) associated with the user. The ID may be associated with a particular mobile device(s) owned by the user. The user account may also include information such as relationships with other users, application usage, location, personal settings, and other information.

Embodiments may utilize substantially any wired or wireless network. For instance, embodiments may utilize various radio access networks (RAN), e.g., Wi-Fi, global system for mobile communications, universal mobile telecommunications systems, worldwide interoperability for microwave access, enhanced general packet radio service, third generation partnership project long-term evolution (3G LTE), fourth generation long-term evolution (4G LTE), third generation partnership project 2, BLUETOOTH®, ultra mobile broadband, high speed packet access, $x^{th}$ generation long-term evolution, or another IEEE 802.XX technology. Furthermore, embodiments may utilize wired communications.

It is noted that user equipment devices can communicate with each other and with other elements via a network, for instance, a wireless network, or a wireline network. A "network" can include broadband wide-area networks such as cellular networks, local-area networks, wireless local-area networks (e.g., Wi-Fi), and personal area networks, such as near-field communication networks including BLUETOOTH®. Communication across a network may include packet-based communications, radio and frequency/amplitude modulations networks, and the likes. Communication may be enabled by hardware elements called "transceivers." Transceivers may be configured for specific networks and a user equipment device may have any number of transceivers configured for various networks. For instance, a smart phone may include a cellular transceiver, a Wi-Fi transceiver, a BLUETOOTH® transceiver, or may be hardwired. In those embodiments in which it is hardwired, any appropriate kind or type of networking cables may be utilized. For example, USB cables, dedicated wires, coaxial cables, optical fiber cables, twisted pair cables, Ethernet, HDMI and the like.

The design of a project may include an efficient method for generating and printing customized items in a system having a client communicable with a network and a server communicable with the network as set forth in U.S. Pat. No. 7,027,001, which is hereby incorporated in its entirety. The client user may be guided through a series of steps to choose a default project item that is compatible with the user's needs (e.g., business cards, binder labels, posters, etc.). After an item is selected, an interactive form may be displayed on the client's computer (e.g., such as through a Website or downloaded software). User information may be entered onto the interactive form, and transmitted from the client's computer (or other device, which may include without limitation, a smartphone, tablet, laptop computer, desktop computer, game console, and the like) to the server over the network.

In some described embodiments, a user may be able to create a design based on a design template. For example, the user may create a design of twenty-four labels positioned to be printed on labels of a sheet comprising twenty-four labels. The design may be saved as a printable file (e.g., PDF, word processing document, image file, etc.). If the user wants to print the same or similar design on a different sheet and/or print medium (e.g., business cards), the user would have to create a new design or manually edit the design to accommodate a different template. This process may be time consuming, frustrating, and difficult for users.

For instance, templates (e.g., template files, templated files, etc.) may be configured to arrange a design according to a physical layout of a product (e.g., a layout of a paper product, arrangement of labels on a sheet, etc.). Templates may be associated with particular types of products. For instance, a label sheet having n labels may be associated with a different (first) template (e.g., format, type, etc.) than a template (e.g., second template) associated with a label sheet having m labels, where n and m are numbers. When a design is applied to a template file and/or created via a template file, the design is arranged to be printed on the associated print-receptive medium.

Systems, methods, and devices disclosed herein may provide for creating a customized template. In at least one embodiment, a system may allow a user to create a custom design for a printable product (e.g., a print receptive media), such as a label sheet, card stock product (e.g., business cards, greeting cards, name plates, etc.), roll of labels, or other product. The customized design may be printed onto the print product on a desktop print or a printer of a provider. For example, the user may provide input to a website or computer application to add custom indicia to be printed on a label sheet and may select to have a provider print label sheets with the custom indicia, or may print the design on a user printer. The provider may then ship the printed label sheets to the user. The user may then desire to add secondary indicia to the printed label sheets. According to various embodiments, the system may provide a custom or smart template to the user for printing the secondary indicia. The custom template may define print areas based on the type of product as well as the initially printed custom indicia. For instance, the initially printed custom indicia may include graphics created by the user. The secondary indicia may include text, such as an address or contact information. The system may prevent printing of the text over the graphics, generate alerts regarding print areas, display the location of designs printed during the primary printing, or the like. The custom template generally prevents or reduces print errors resulting from printing over the initial custom indicia.

A smart template that facilitates a first or initial print design and a secondary or subsequent print design is described herein. The smart or custom template may identify print areas based on the initial design and a print medium. The custom template may be utilized to generate warnings, suppress print elements, or the like. It is note that some customers may have a desire to design and order custom printed products such as labels, cards or name badges with professional multi-color print for fixed elements, then print additional variable information on-demand using an onsite printer. Embodiments described herein may provide solutions to this demand. Such embodiments may define a process of designing and ordering a custom first print product and then easily and reliably align and print the second print elements on-demand using an onsite printer. It is noted that some embodiments may generate smart/custom templates for pre-printed products.

In an example, a system may comprise a software product that provides design capabilities (creation and editing of text and graphics) and maps a digital layout of panels or tables on a page (e.g., in a file, a digital page, etc.) in direct correspondence to the physical layout of die-cuts on a sheet of paper, cardstock, or other print receptive media onto which a user has provided custom indicia prior to the mapping. This may include dynamically identifying secondary print areas after user customization of initial print areas. The secondary print areas may be stored in a memory and accessed by a user account, may be coded in or on a printed product, or the like. Further still, the system may dynamically alter the print file based upon a make and model of a user's printer or the like. Additionally or alternatively, the system may permit dynamic alteration of the print parameters, including, without limitation, location, color, size, layout, aspect ratios, etc. as a function of a make/model of a printer, a type of ink cartridge used, or the like. In one aspect, the system may alter colors or resolutions of a print file to match or improve a match of print colors between the user's printer and a commercial printer.

The disclosed systems may provide quality control by producing and controlling both the digital and physical aspects of a user's experience (digital design and printed media). Using the systems and/or methods, a user may design a creative project and have the choice to print additional designs or information on media after receiving a customized print project without having to estimate print areas or the like. For instance, a user may desire a large number of custom printed products (e.g., name tags, address labels, etc.). The user may want to then add unique information on each of the printed products, such as a name, a logo, a photo, an address, or the like. Disclosed embodiments may allow the user to create and order a custom print project and then access a custom template that identifies print areas for the custom print project.

Customizable items may include appropriate items amenable to printing. Non-limiting examples of such customized items include business cards, invitations, labels (e.g., address labels, shipping labels, CD labels, etc.), flyers, greeting cards, binders, dividers, posters, wall décor, folded cards, postcards, t-shirts, hats, mugs, etc. Customizable items may be represented as sheets (e.g., on a webpage or as part of a downloaded program). Each sheet may contain one or more labels or cards. The display for the labels and cards may vary. For example, labels may be depicted on a sheet containing multiple labels and a card may be depicted as individual designs in a canvas, given that cards may be sold and shipped in stacks (e.g., not sheet form). It is noted that the present disclosure is not limited to these types of print media. Any appropriate print media may be utilized with the present teachings. Some print media may include label sheets or product sheets that may be 8.5 inches by 11 inches, 12 inches by 18 inches, A4 size, legal size or any other size. In another aspect, print media may include roll material, such as a roll of die cut labels or the like.

In another aspect, the present disclosure relates to a system and method for generating a customized item and printing it at any type of printer or to any location. The system and method may provide for a configurable design tool that meets the needs of various design applications for generating a customized item and printing that item at any type of printer or to any location. The present disclosure further allows for reprinting on the customized item with additionally or secondary indicia via any type of printer or to any location.

At least one embodiment of the present disclosure is an efficient method for designing a project (e.g., a customized item such as business cards, invitations, labels, etc.), preparing that project for printing to any printer type or location such as a local desktop printer or a remote professional digital press for fulfillment, designing a secondary project for printing on the previously printed item and preparing that secondary project for printing to any printer type or location such as a local desktop printer or a remote professional digital press for fulfillment, In some embodiments, systems and methods will utilize a first print file to print first indicia and may then, from that first print file, render a version that becomes a template for second indicia. In other embodiments, the systems and methods may create a single print file that may include information as metadata to be used for printing of secondary indicia. It is noted that various other files may be created or utilized based on the first print file.

The described systems and/or methods allow a user to create a project once and create custom templates for reprinting on custom items. The user may optionally save the project (e.g., to a user account, on a user's hard-drive or on a storage medium), print the project and a secondary project after printing the project to any type of printer (e.g., a desktop printer or a professional printer) or to any location (e.g., local or remote). The described systems and/or methods may save users time, increase user satisfaction, and/or may be more efficient than traditional systems.

Referring now to FIG. 1, there depicted is a block diagram of a functional printing system 100 that may generate and/or print customized items in accordance with various described embodiments. Printing system 100 may primarily include customization component 106, memory 102, and processor 104. Memory 102 may be configured for storing computer executable components such as a design component 110, a print component 130, and a user account component 140. Processor 104 may facilitate operation of the computer executable components. It is noted that system 100 may include one or more devices, such as a user device, a printer, or the like. It is further noted that one or more devices may comprise, at least in part, the various components. For instance, a single component of system 100 may be comprised by one or more devices. In another aspect, while shown as separate or distinct components, the components of system 100 may be comprised by one or more components.

The printing system 100 may allow for efficient designing and/or printing of a project, such as a customized item (e.g., business cards, invitations, labels, or the like). In another aspect, the printing system 100 may be configured to prepare the project for printing to an appropriate printer on a desired print medium. The printer may be a printer directly or indirectly connected to the printing system 100, such as a desktop printer, personal printer, network printer, or the like. In another aspect, the printer may be a printer of a service provider (e.g., a commercial printer). The printing system 100 may allow a user to design a project, print the project on a print medium, then design a secondary project for printing on the same print medium. The printing system 100 may create customized or smart templates for designing the secondary project for printing on the print medium. System 100 may be better understood with reference to an exemplary environment.

Figure 2:
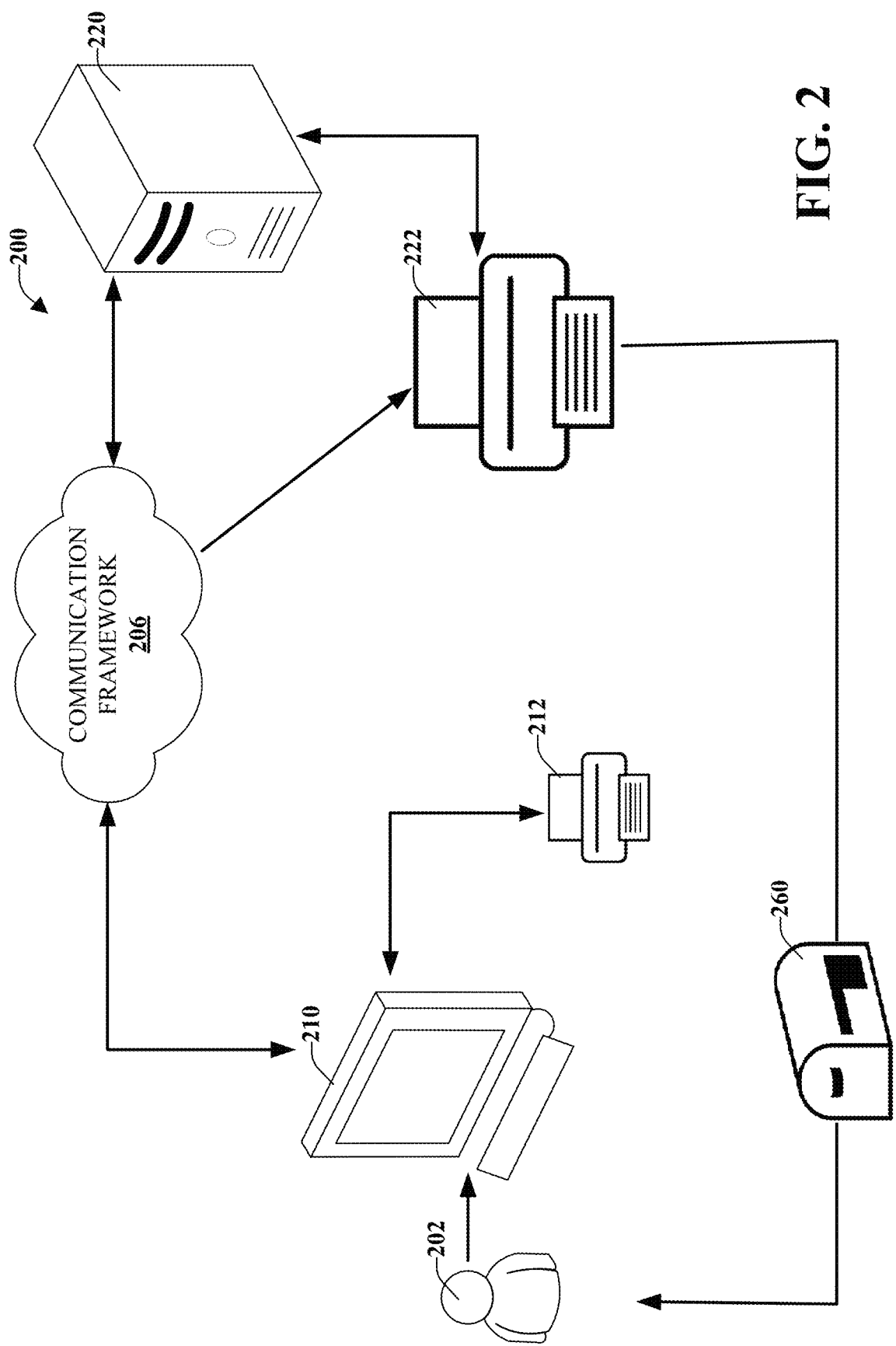
FIG. 2 is an environmental diagram of a printing network, in accordance with various described embodiments
Figure 3:
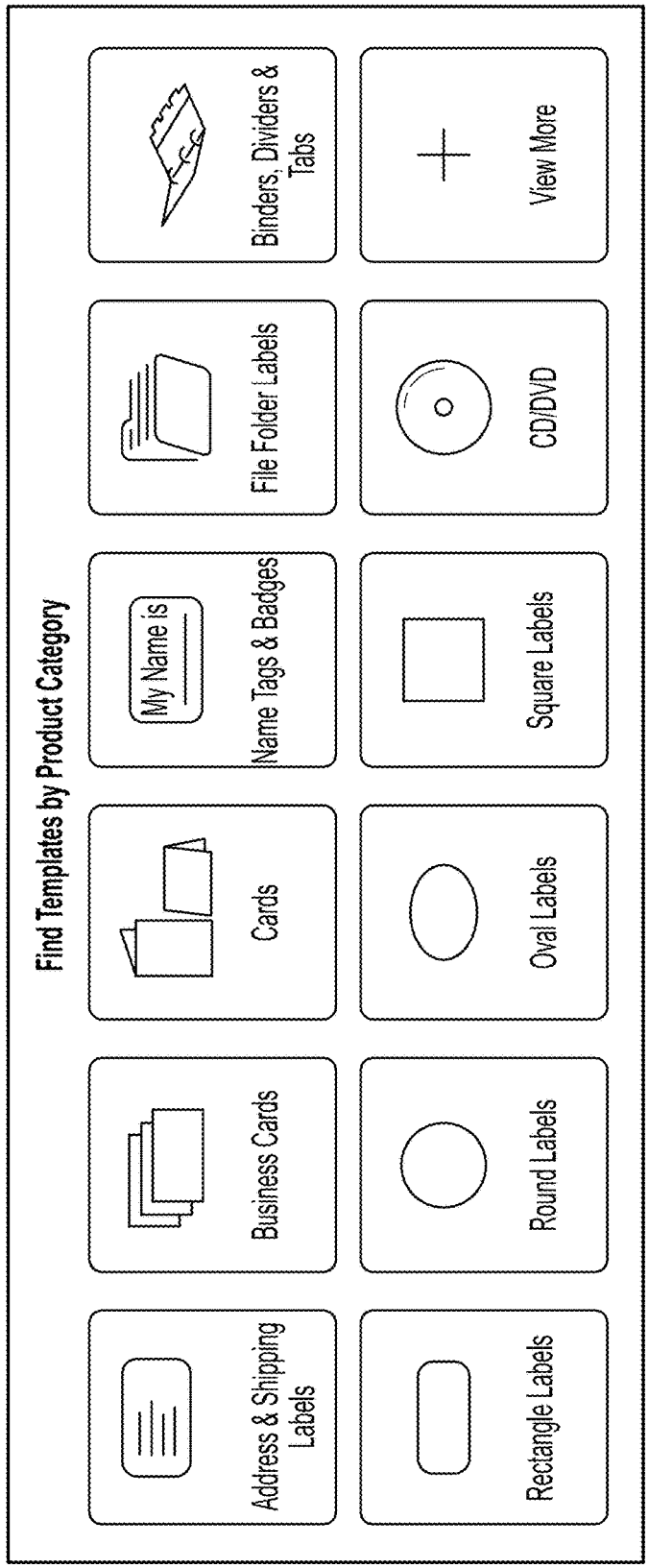
FIG. 3 is an example interface for designing a project with the system including a product selection interface, in accordance with various described embodiments.

Turning now to FIG. 2 with reference to the other figures, there is an exemplary environment 200, in accordance with various disclosed embodiments. It is noted that printing system 100 may comprise some or all components of environment 200. A user 202 may interact with a user device 210 to design a project or otherwise access a project. The user device 210 may comprise a desktop computer, laptop computer, smart phone, tablet, or the like. In an aspect, the user device 210 may be coupled to (and/or integrally formed with) local and/or user printer 212. It is noted that the user device 210 and user printer 212 may be a common device, may be communicated via wireless and/or wired connections, or the like. While described as a local/user printer, user printer 212 may be a commercial printer that may be located at a place of work, library, retail store, or the like. For instance, a user 202 may design a project and may store the project to a server or database 220 (e.g., and/or to storage devices). The user 202 may access the user printer 212 to print the project. In an example, the user 202 may create a project via the user's personal computer (e.g., user device 210). The user 202 may save the project to removable memory device (e.g., thumb drive) and may travel to a retail store that offers printers (e.g., user printer 212) for rent and/or public use. In an aspect, the user 202 may load a desired print stock (e.g., label sheet, card stock, etc.) to the retail printer and initiate printing. In other examples, the user printer 212 may be a printer located at the user's residency and/or connected to the user's home network.

Figure 7A:
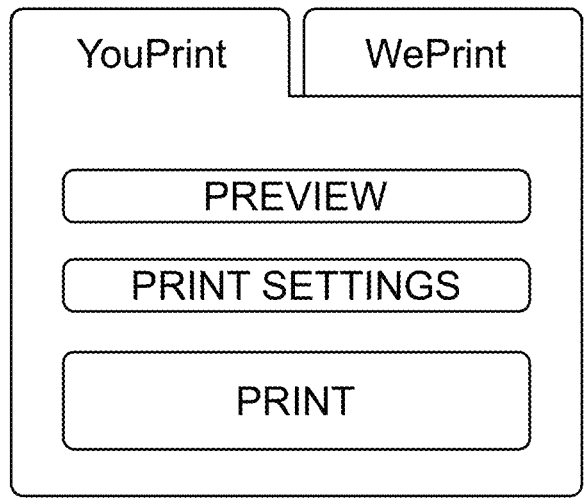
FIGS. 7A-7B are exemplary interfaces of a printing system associated with selection of an on-site printing or a professional printing, in accordance with various described embodiments.
Figure 7B:
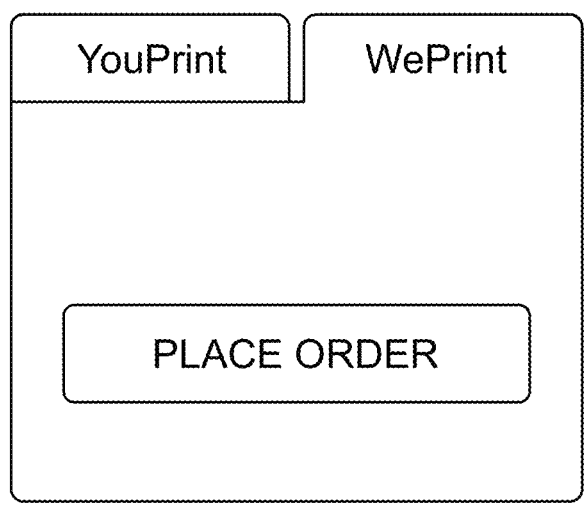

According to embodiments, the user 202 may provide input to the user device 210 to design or otherwise access a project (e.g., such as a saved or public project). The user 202 may choose to print the project via user printer 212 and/or via a professional printer 222. For instance, user 202 may provide input to user device 210 to print to the user printer 212, such as via selecting to print via a "YouPrint" tab (such as described herein with reference to FIG. 7A). The user 202 may additionally and/or alternatively select professional printing via the "WePrint" tab (such as described herein with reference to FIG. 7B). It is noted that the renderings depicted in FIGS. 7A and 7B may be rendered by printing system 100. Moreover, the user 202 may be required to make a payment if the user 202 requests professional printing. Once printed by the professional printer 222, the professional printer 222 may send the printed products to the user 202 via a shipping or deliver service 260.

In at least one embodiment, the user printer 212 may be associated with specific types of print-receptive media. The print-receptive mediums may comprise particular layouts and/or properties. For instance, an address label sheet may be usable with user printer 212 and may have twenty-four labels with spaces added between each label panel, or forty-eight address labels with no bleed areas on an 8.5 in.×11 in. sheet. It is noted that other appropriate label sheets may be utilized. It is further noted, as described herein, that other print-receptive media may be utilized.

In another example, a user may indicate that a project is complete by saving, printing, and/or ordering prints from a professional printer. As described here, the user 202 may select any of a plurality of printers, types of printers, printer locations, or the like. For instance, the user may print the project via the user printer 212 and/or professional printer 222. It is noted that user printer 212 and professional printer 222 may comprise a plurality of printer types or locations, such as a local desktop printer or a remote professional digital press for fulfillment. The plurality of printer types is not limited to any particular type of printer. Embodiments of the present teachings may be applied to any type of printer, including, without limitation, commercial printing devices, inkjet printers, laser printers, dot matrix printers, digital printers, bubble jet printers, electrophotography printers, sold ink printers, heat transfer printers, etc.

Once the user 202 has the printed products, the user 202 may utilize the user printer 212 to print secondary or additional indicia on the printed products. For instance, the user 202 may utilize the user device 210 to access the system 100. The system 100 may identify print areas associated with the prior printed product. The print areas may be based at least on part on the user's prior customized design. As such, the system 100 may generate a custom or smart template for the prior printed product. The smart template may be stored in memory, such as via server 220, user device 210, the communication framework (cloud) 206, or other memory. It is further noted that the template may be sent to a user via an electronic message, a CD, a flash drive, or the like.

In at least some embodiments, a smart template may know or identify that a user or the system changed an element of a primary or prior printed design, such a location or size of an image. The smart template may identify the change or alterations and may accordingly render prior indicia or may automatically resize and relocate the secondary indicia according to the smart template.

The smart template may define safe print areas and restricted areas to avoid or reduce printing over the user's prior customized design. For example, the user 202 may create a customized set of labels and may order them printed via the professional printer 222. The user's custom project may be saved and/or utilized to generate a custom/smart template that may be saved for future use. The user 202 may create a secondary design (and/or addition designs) to print on the customized set of labels. The secondary design may be graphics, text, or the like. In some embodiments, the smart template may be utilized to restrict or prevent a user from printing over an initial design. In some other examples, the smart template may display the original design on a template and a user may manually determine where to place new indicia for the secondary design without the system generating warnings or restricting placement of the secondary design.

Referring back to FIG. 1, the design component 110 may be configured to generate a user project. The project may be a design project for printing on a print-receptive medium. For example, a user may wish to create a custom design for a label, such as with a user-generated or uploaded picture. The user may upload the picture (e.g., design component 110 may receive as input 114) to the printing system 100 from a user device and/or may capture the picture via a user device (e.g., digital camera, scanner, smart phone, etc.). The design component 110 may comprise tools allowing a user to edit, save, upload, or otherwise alter their design. In an example, the user may utilize a desktop computer, laptop computer, tablet computer, smart phone, or another device to interact with printing system 100, such as via an application (e.g., "app," etc.), website, or the like.

In an aspect, the design component 110 may provide tools for customization of a design. For instance, the design component 110 may provide tools that allow a user to add an image to a design. The image may be a user-generated image, a captured image (e.g., such as with a digital camera, scanner, etc.), an image selected from a file (e.g., an image stored in a database), or the like. In another aspect, the design component 110 may receive user input to add textual data, barcodes (e.g., linear barcodes, matrix barcode, such as QUICK RESPONSE CODE (QRC), or the like), or other visual elements to the design. It is noted that visual elements may be in any desired format or file type (e.g., graphical image format (GIF), Joint Photographic Experts Group (JPEG), JPEG 2000, raw image format (RIF), bitmap (BMP), portable network graphics (PNG), etc.).

According to at least one aspect, the design component 110 may render a template selection interface 300 and a product selection interface 400. The template selection interface 300 may identify a top tier of available templates, such as CD labels, shipping labels, cards, name tags, folder tabs, or the like. The product selection interface 400 may allow a user to select a particular type of print medium, such as a particular die cut label sheet, card stock product, or the like. The design component 110 may further render a project editing/generating screen to allow a user to visualize and/or alter the project.

Figure 5A:
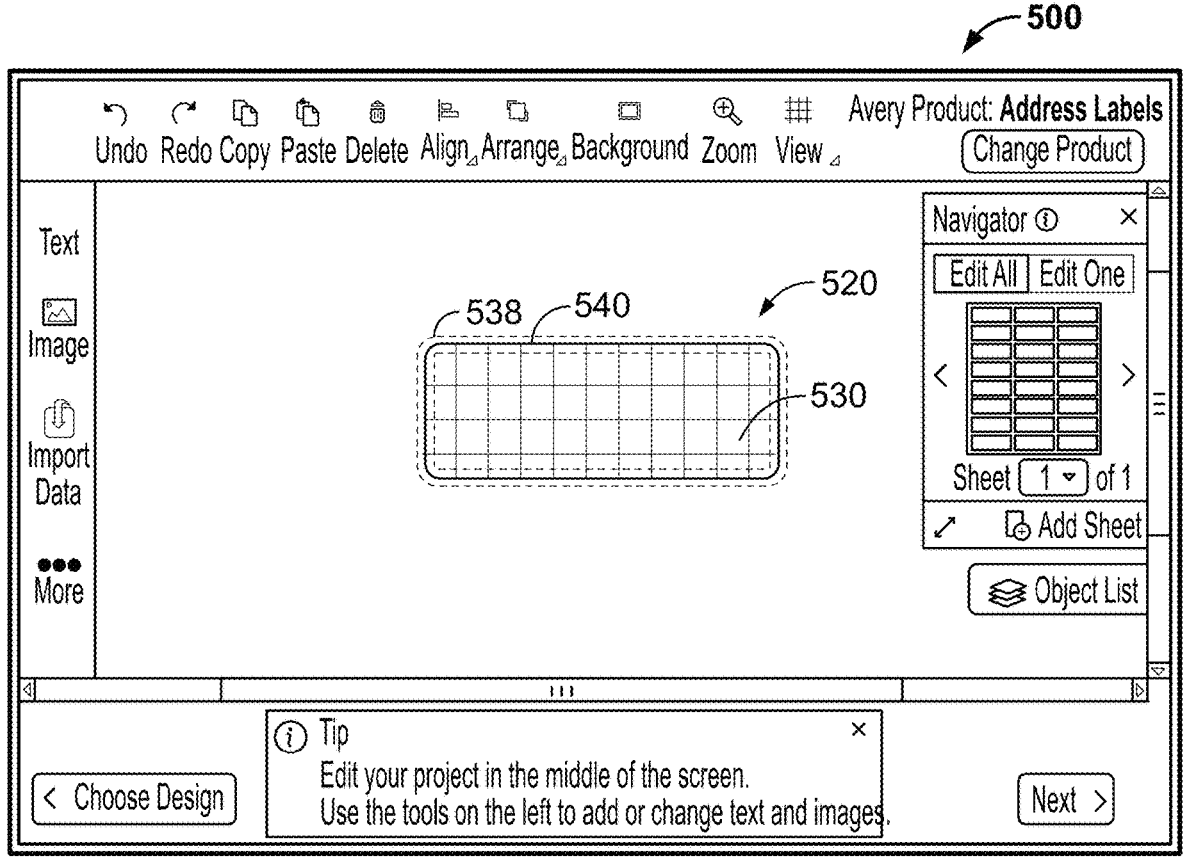
FIG. 5A-B is an example interface for designing a project with the system including a design interface, in accordance with various described embodiments.
Figure 5B:
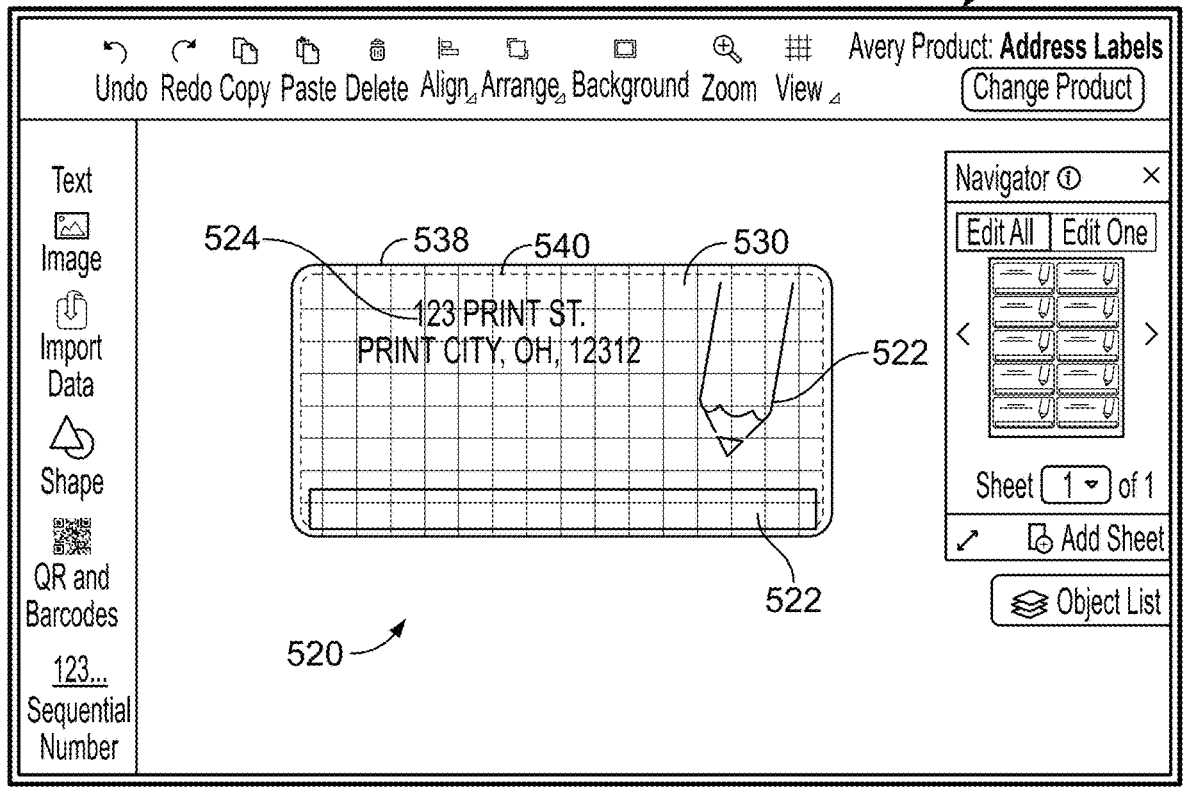

For example, the design component 110 may generate/render design interface 500 that facilitates design of custom products either through selecting a stock design, uploading of user provided images, editing text, positioning of text or other indicia, and the like, as shown in FIGS. 5A and 5B, where FIG. 5A illustrates a blank design and FIG. 5B illustrates a design with added visual elements. In another aspect, the design component 110 may provide tools, such as text editing tools and/or image editing tools. A user may interact with an interface device (e.g., touch screen, computer mouse, keyboard, microphone, etc.) to provide input and/or make desired selections for editing text via the editing tools and/or editing images via image editing tools.

It is noted that design component 110 may provide various other tools for editing the design.

According to an embodiment, the design component 110 may provide a design area or canvas 520. The canvas 520 may represent an area where a user may view a position of various visual elements. For example, the canvas 520 may provide a rendering of a graphical image 522, a textual image 524 (e.g., text box), and any number of other desired visual elements. In another aspect, the design component 110 may provide one or more borders and/or margins that indicate areas/parameters for printing on a desired medium. For example, the design component 110 may identify an internal or safe area 530, a danger or bleed area 540, and/or an absolute border 538. The safe area 530 may represent an area that is not subject to bleeding and/or cutoff due to the print-receptive medium and/or printer. The bleed area 540 may represent an area that may be at risk of bleeding or cutting. This area may represent an area needed to accommodate variances and/or error tolerances of printing or cutting, such as for labels, die-cut products, or the like. The absolute border 538 may represent a border where an image will not print on a desired print-receptive medium. The borders and/or areas may be depicted on the canvas to inform users where to place visual elements. This may ensure that designs positioned on physical materials generally match what is displayed on a screen. In an aspect, warnings may be rendered or otherwise generated (e.g., audio, visual, etc.) when visual elements are outside of the safe area 530, bleed area 540, and/or absolute border 538. In another aspect, design component 110 may render visual elements differently in the different areas. For instance, graphical image 522 may be altered (e.g., shaded or dulled) in the bleed area 540 compared to the safe area 530. In another aspect, the graphical image 522 may be altered (e.g., shaded or dulled) when past the absolute border 538 in comparison with the portions thereof in the bleed area 540 and/or the safe area 530. It is noted that a user may provide input 114 instructing design component 110 to alter visual elements by moving, enlarging, shrinking, altering parameters (e.g., color, hue, opaqueness, etc.), rotating, or otherwise manipulating the visual elements. In at least one aspect, the size of the safe area 530, bleed area 540, and/or absolute border 538 may be determined based on a desired print medium.

Figure 6:
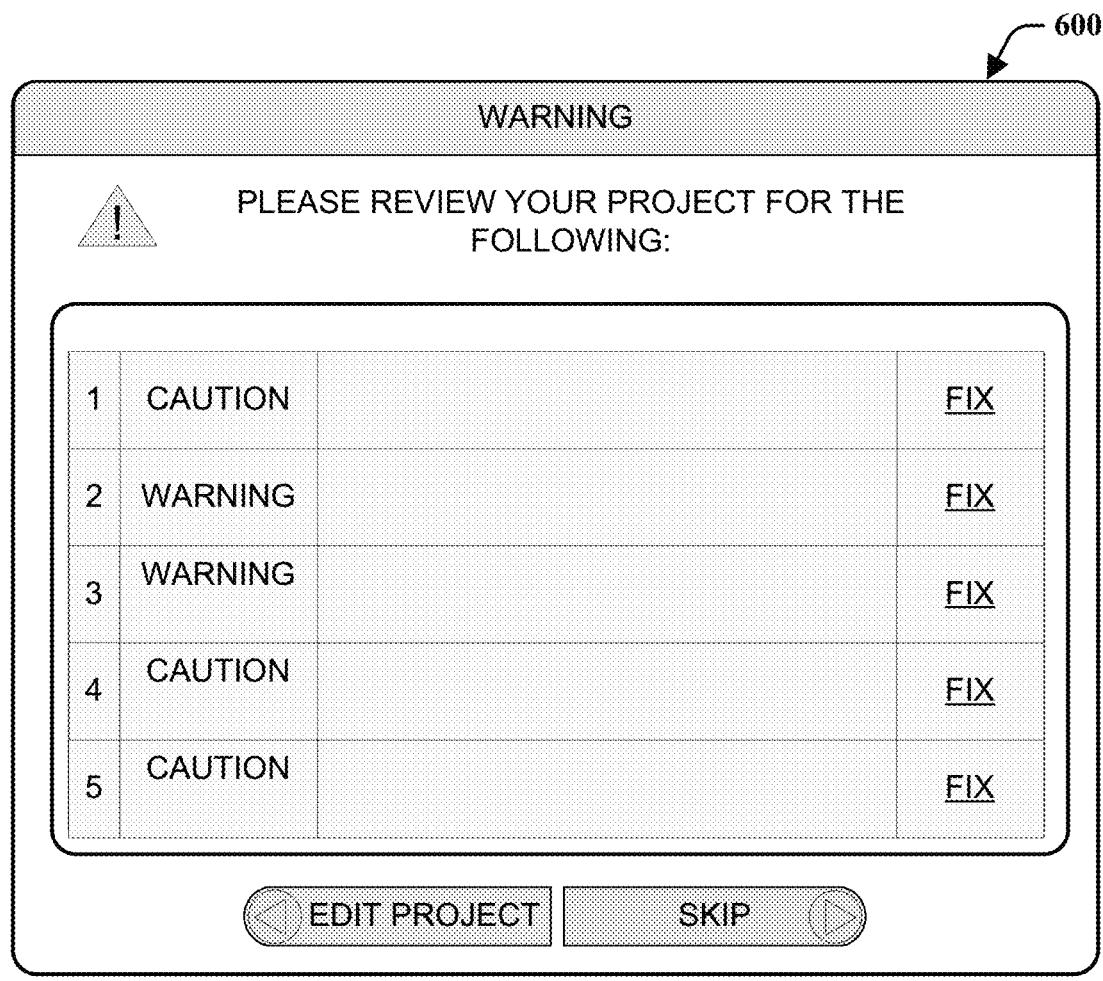
FIG. 6 is an example warning box generated by the system including multiple warnings, in accordance with various described embodiments.

The design component 110 may include a mechanism to generate and/or render warnings 600, as shown in FIG. 6. The warnings 600 may comprise visual, audible, tactile (e.g., such as vibrations in mobile applications), or other warnings. The warnings 600 may relate to parameters of the visual elements. For example, the warnings 600 may relate to a position (e.g., relative to canvas and/or other visual elements), resolution, aspect ratio, color, transparency, or the like of graphical image 522 or other visual elements. In another example, the warnings 600 may relate to a position, size (e.g., font size), spelling/grammar, or the like. In another aspect, a warning may include a solution or course of action to remedy the warning and/or a selectable tool for directing a user to correct the image. It is noted that the system may render warnings 600 individually and/or in composites. In at least one embodiment, the warnings 600 may comprise a popup box, fly-out, or the like.

For instance, warning 600 may warn a user that, "Your image is smaller than recommended. Please use a higher quality image for better results." The user may proceed with the image or may edit the image, such as providing a higher quality or larger image. The warnings may include an identifier (ID), a warning type (e.g., caution, warning, etc.), a description, and/or a link to fix or remedy the warning. The warning type may include various taxonomies and/or scales of warnings that may indicate a severity of a warning and/or likelihood of potential errors. For instance, a "caution" type warning may indicate a potential for an error, while a "warning" type may indicate a greater likelihood for an error. It is noted that a user may choose to remedy the warnings and/or may ignore the warnings. It is further noted that the warning 600 may be displayed (or otherwise communicated to a user) upon occurrence of a triggering event that may occur at any time, such as after printing system 100 receives input indicating a user desires to print or add an order to a cart, after an error is detected, when a user opens or saves a project, or the like.

In another aspect, the design component 110 may provide a menu bar that may provide a user with tools and/or controls. The tools and/or controls may allow a user to save a project, select a project, contact a support service, review help menus, cancel changes, or the like. It is noted that the design component 110 may provide various other controls for a user. In an embodiment, the printing system 100 may allow a user to print a project with a local printer, as shown via FIG. 7A, and/or order professional prints from a service provider, as shown via FIG. 7B. For example, the printing system 100 may interface with an ecommerce platform to retrieve unique order information and pass order details, including product configuration and links to project files, for printing. This allows a user to edit before placing an order. For instance, a user may desire to utilize the same design for multiple orders/printing processes or the user may make changes before ordering/printing.

In an embodiment, the printing system 100 may render landing pages for each category of print-receptive item (e.g., address labels, business cards, etc.). These pages may pass information such as SKU and promo/discount code information to the printing system 100. In another aspect, a user may switch between types of print-receptive items from a single page. In an example, the user may preview a final project and/or individual project via a navigator tool.

Print component 130 may request printing of a project. In an aspect, the print component 130 may comprise print drivers or other interfaces that may interact with a printer. Print component 130 may receive a printable file and may instruct a printer (e.g., local printer 212, professional printer 222, etc.) to print a project. In at least one embodiment, the print component 130 may comprise one or more printers. It is noted that print drivers may read printable files for printing on a specific printer. Such may not be considered conversion of a file type as described herein, such as a raw project file. The raw project file may comprise a printable source file or source design that can be used by a plurality of printer types at any printer location, including printing the source file or source design. Print component 130 may generate printable files automatically (e.g., without requiring a user to modify the source design). For example, a customized business card may be created on a Website and saved to a user account, such as via user account component 140, associated with a user entity (e.g., user identify (ID), user device 210, etc.). The user 202 may provide input to user device 210 to instruct user printer 212 to print this customized business card. The user 202 may additionally or alternatively provide input to user device 210 that initiates transmission, via communication framework 230, of an order to a professional printing service, which may print the order via professional printer 222.

Printing system 100 may save projects and/or other information to a user account via user account component 140. In examples, user account component 140 may alter or access a user account associated with a user entity that may be identified by a user ID (e.g., user name, user email address, etc.), a user device, or the like. The user account may comprise project data (e.g., past projects, past orders, etc.), payment data, settings data, or the like. User account component 140 may allow a user to provide input to alter (e.g., update, change, add/remove, etc.) portions of the user account. In another aspect, the user account component 140 may store projects (e.g., via memory 102, database 220, or the like) for future use by the user and/or other users. For example, a user may (at any time) share their project with select users (e.g., friends or contacts on a social media network), all users, or no users.

Figure 8:
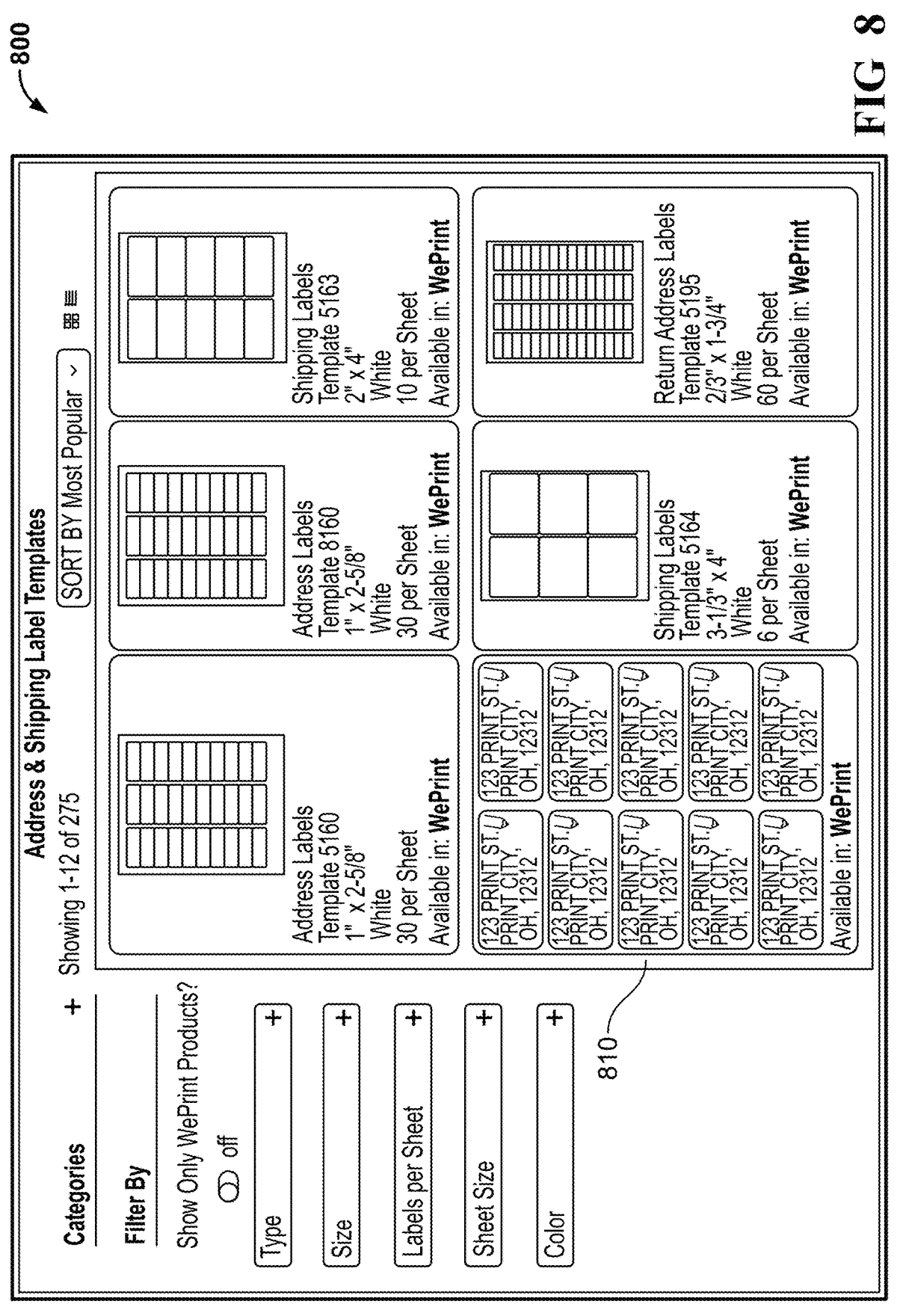
Figure 9A:
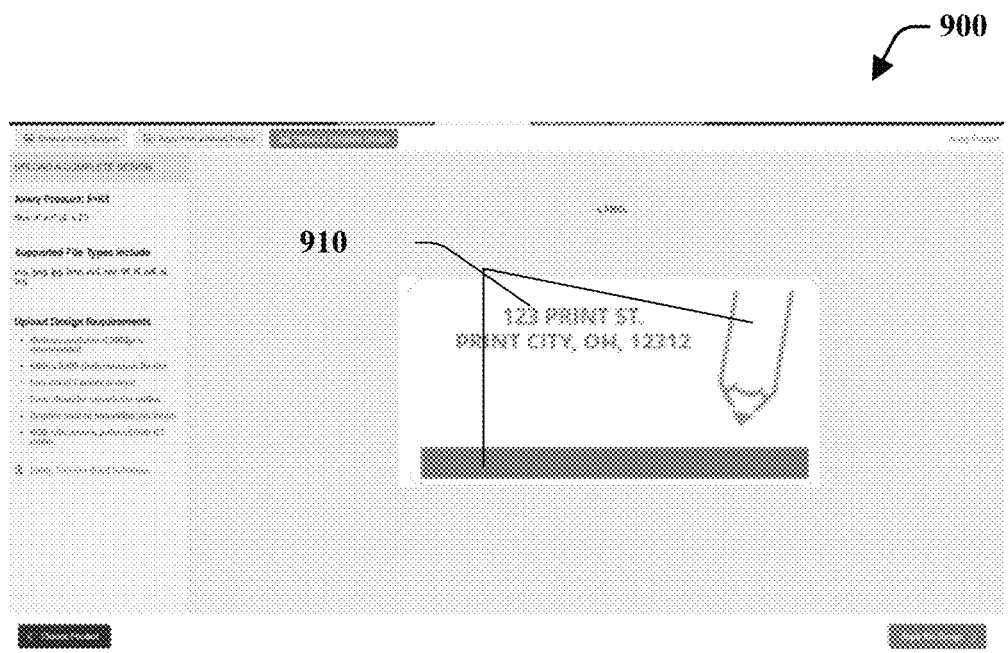
FIGS. 9A-B is an example interface for designing a project with the system including a design interface with print areas based on a prior custom design, in accordance with various described embodiments.

In at least one embodiment, user account component 140 may store a custom/smart template generated from a prior design project. For instance, the custom template may define a print media type as well as print areas defined by the print media used for a prior project and the user's custom design for the prior project. As an example, the system 100 may render a product design interface 800, as shown in FIG. 8, which may allow a user to select the custom template 810. Once selected, the system 100 may render a generate/render design interface 900, as shown in FIG. 9A, with primary or prior indicia 910 from the prior project displayed therein. The prior indicia 910 may represent indicia actually printed on an ordered or printed product. It is noted that the prior indicia 910 may be rendered as non-selectable objects, grayed out objects, or otherwise distinguished objects to convey that the indicia 910 is associated with the prior printed media.

Figure 9B:
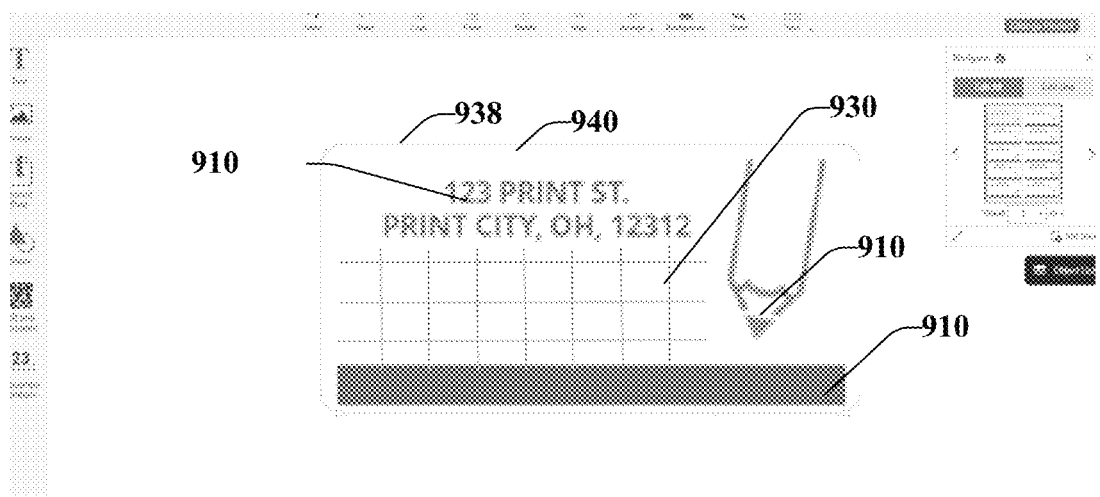
Figure 10:
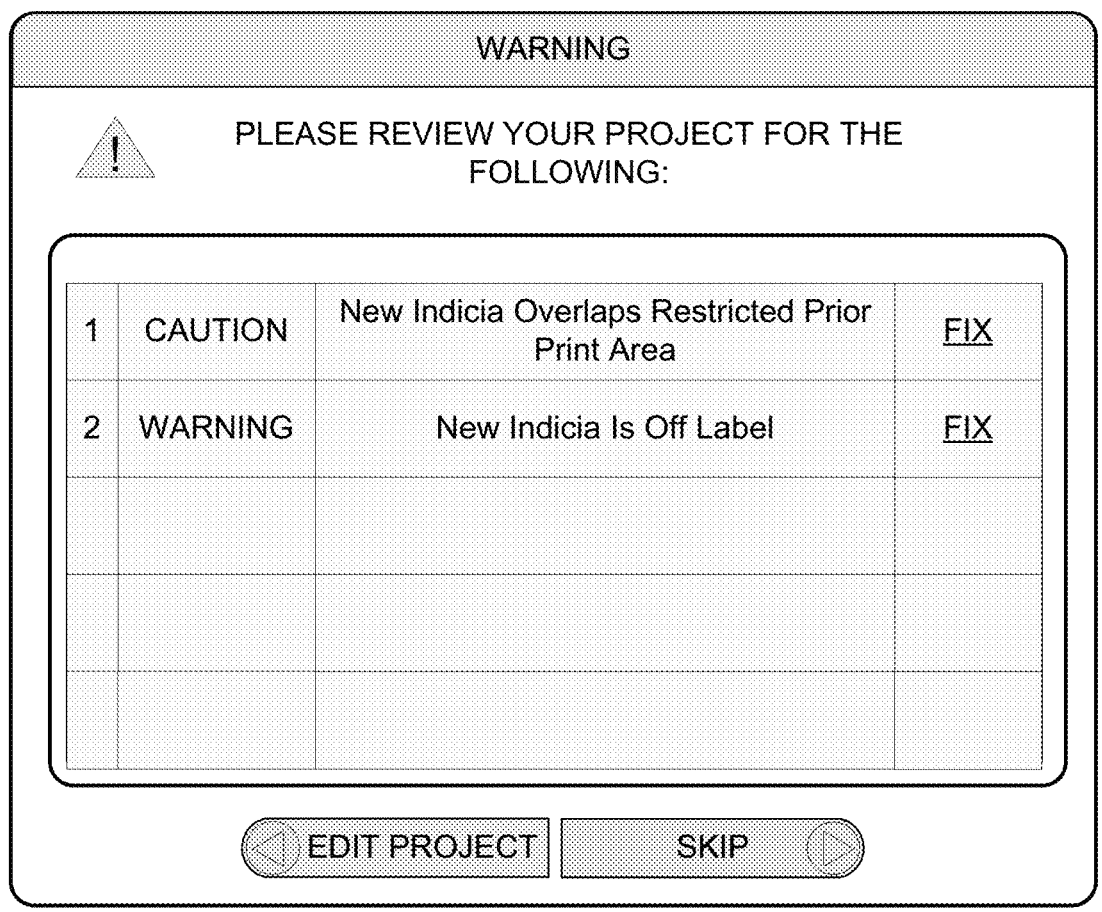
FIG. 10 is an example warning box generated by the system including warnings associated with a custom template, in accordance with various described embodiments.

FIG. 9B illustrates the design interface 900 with print areas, such as safe area 930, a danger or bleed area 940, an absolute border 938, and/or restricted prior print areas 910. The safe area 930 may be limited such that it does not overlap restricted prior print areas 910. If a user attempts to add graphics, text, or other visual elements over some or all of restricted prior print areas 910, the system 100 may generate warnings 1000, such as described in FIG. 10. The warnings 1000 may comprise, for instance, warnings that the user has added visual elements over the prior print areas 910 or has placed new visual elements within the bleed area 940 or over the absolute border 938. The new visual elements may be printed on the prior printed media in a "reprint" operation that does not print to the prior print areas 910. It is noted that the custom template prevents or reduces print errors, increases proper alignment, and may generally allow for increased satisfaction. Moreover, embodiments may provide for previews of a "reprinted" product prior to an actual reprinting operation.

Figure 11:
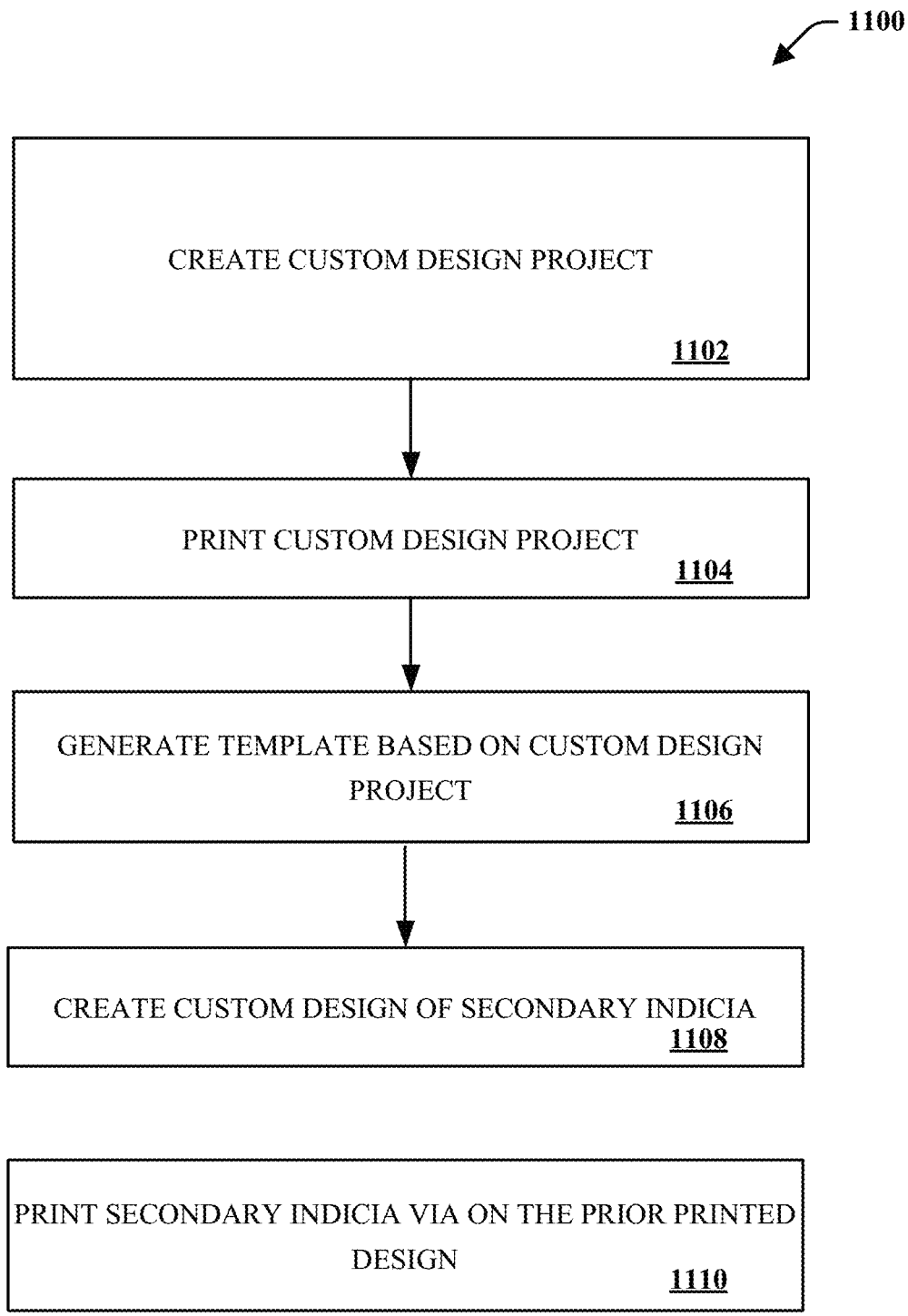
FIG. 11 is a flow diagram of an exemplary method associated with a printing system that may facilitate design of a project and reprinting, in accordance with various described embodiments.

Turning to FIG. 11, illustrates an exemplary method according to various disclosed embodiments. For instance, FIG. 11 may comprise a design and printing method 1100 associated with a printing system (e.g., printing system 100). While the methods are shown and described as a series of blocks, it is noted that associated methods or processes are not limited by the order of the blocks. It is further noted that some blocks and corresponding actions may occur in different orders or concurrently with other blocks. Moreover, different blocks or actions may be utilized to implement the methods described hereinafter. Various actions may be completed by one or more of users, mechanical machines, automated assembly machines (e.g., including one or more processors or computing devices), or the like.

FIG. 11 depicts an exemplary flowchart of the method 1100 associated with a printing system, according to various aspects of the subject disclosure. As an example, method 1100 may generate a custom project, print the project on media, generate a template based on that product, and allow a user to print additional indicia on the media via the generated template.

At 1102, a system comprising a processor (e.g., printing system 100) may create a custom design. For instance, the system may receive input for a project design. The input may include, for example, user input relating to visual design elements. In another aspect, the input may comprise information retrieved from a database (e.g., such as a stored project, image, or the like). In an example, a user may identify or capture (e.g., via a user device) an image to add (e.g., upload) to a project. It is noted that the input may comprise any indicia, such as imagery, text, or other visual elements.

At 1104, the system may print the primary custom design project. For instance, the system may receive input identifying selected print modes, print mediums and/or printer devices associated with the project. For instance, a user may provide input regarding a preferred method of printing (e.g., user printing, professional printing, etc.). In another aspect, the user may select a print medium (e.g., label sheet, card stock, etc.), printer device, or the like. It is noted that the input may be received from devices or other systems. For example, a user may select a print mode. Based on the selected print mode, the system may automatically determine available print mediums and/or printer devices, such as via information received from a database and/or by identifying available devices. In another aspect, the system may initiate a printing process based on a received printing request. The received printing request may be initiated in response to input received from a user. For instance, a user may enter information for printing, such as a quantity, a method of printing, payment information, delivery information, or the like. Once satisfied, the user may provide input to initiate printing. The system may transmit and/or process the print request based on the selected print parameters. In an aspect, the printing method may include printing via a user printer, a service provider printer (e.g., professional printing device, etc.) or the like. In an example, a professional printing device may automatically print a design upon receiving an order. In another example, an order may be reviewed by a service provider, and the service provider may then authorize printing At 1106, the system may generate a custom template based on the primary custom designed project. The custom template may define a safe print area based on at least the print media of the project and visual elements added to the custom design. In an aspect, the custom template may additionally or alternatively define warnings, error messages, alerts, or the like. The custom template may be stored in a memory, coded in indicia printed on a product, or the like.

At 1108, a user may create a custom design of secondary indicia to be printed on the printed project. For instance, the user may place a prior printed project in a printer feed and may utilize a system to create a design to print on the prior printed project, such as through the use of the custom template. In an aspect, the secondary indicia may be provided from a database and automatically sized and positioned relative to the primary indicia.

At 1110, a user may print the secondary indicia on the primary design without printing on the primary design in accordance with various disclosed aspects.

Methods of the present teachings may further include the step of creating a printable file or a plurality of printable files and printing the printable file on a client-controlled printer. The printable file may need to accommodate mechanical characteristics of the particular client-controlled printer in the form of horizontal and vertical page position offsets. The offsets may be stored for each user for each kind of major paper size including, without limitation US Letter and A4 paper sizes. The offset value may be selected by an optional alignment procedure the customer may execute from within the program after creating any printable file. Thereafter the new offset value may be stored and the offset value automatically supplied to every subsequent printable file generated by the user until the user elects to modify the offset value. The printable item file may be a Portable Document Format (PDF) file, a Postscript file or another format known in the art or developed in the future.

Additionally, printable media products (e.g., customizable items) may take the form of software objects, which may generate strings of text describing the media products. The interactive project selection process presented to the client, therefore, may be presented as a series of transient HTML pages, readable within a Web browser and dynamically regenerated according to user input and the presence of media product objects and item templates on the server. Rather, systems and methods of the present teachings may use any of a number of descriptive files to represent products within a product line. Such files may be called "project objects," "product object files" or "SKU object files" and contain descriptive product data therein.

Figure 12:
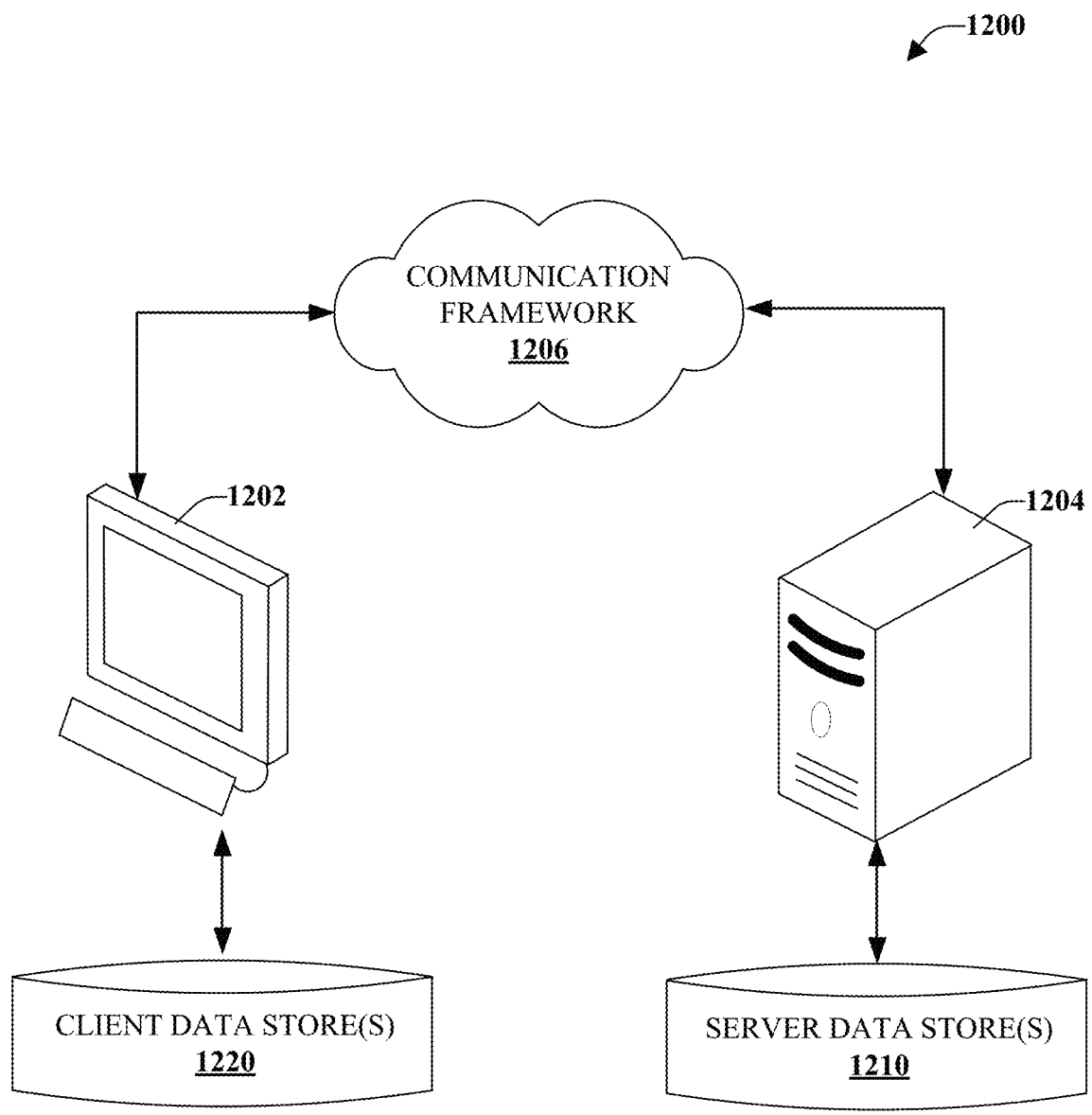
FIG. 12 is an environmental diagram of an exemplary communication system, in accordance with various embodiments disclosed herein.
Figure 13:
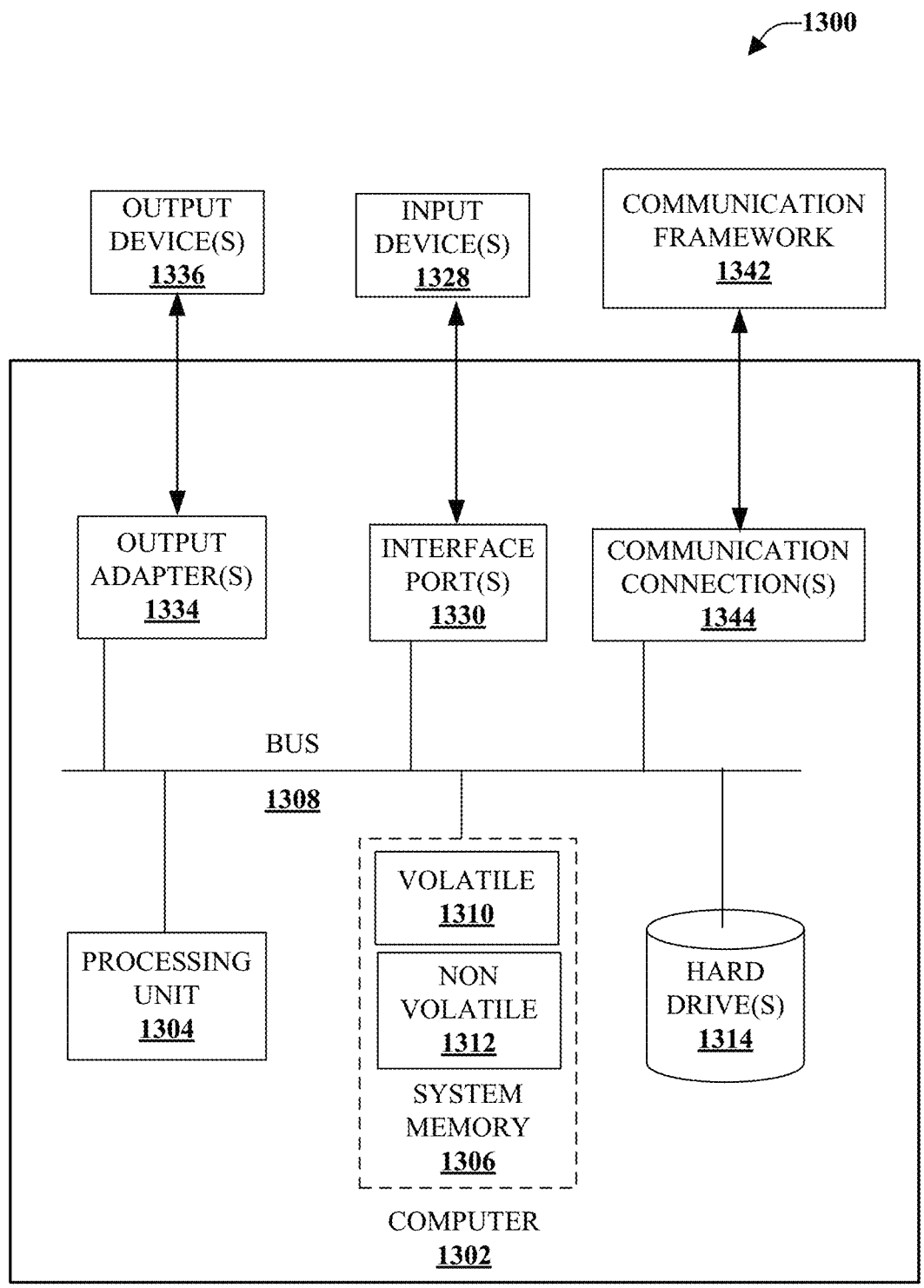
FIG. 13 is a block diagram of a functional computer system in accordance with various described embodiments.

What has been described above may be further understood with reference to the following figures. FIGS. 12 and 13 provide exemplary operating environments or systems capable of implementing one or more systems, apparatuses, or processes described above. FIGS. 12 and 13 are not intended to limit the scope of such systems, apparatuses, or processes. By way of example, computing environment 1200 may refer to one or more embodiment of the various embodiments described with reference to the above figures. However, variations to computing environment 1200 may be obvious to achieve aspects or processes described herein.

FIG. 12 is a schematic diagram of a computing environment 1200 in accordance with various disclosed aspects. It is noted that computing environment 1200 may include various other components or aspects. As depicted, computing environment 1200 may include one or more client(s) 1202, one or more server(s) 1204, one or more client data store(s) 1220, one or more server data store(s) 1210, and a communication framework 1206.

While depicted as a desktop computer(s), client(s) 1202 may include various other devices that may comprise hardware and/or software (e.g., program threads, processes, computer processors, non-transitory memory devices, etc.). In an example, client(s) 1202 may include laptop computers, smart phones, tablet computers, wearables, etc.). The client(s) 1202 may include or employ various aspects disclosed herein. For example, client(s) 1202 may include or employ all or part of various systems and processes disclosed herein.

Likewise, server(s) 1204 may include various devices that may comprise hardware and/or software (e.g., program threads, processes, computer processors, non-transitory memory devices, etc.). Server(s) 1204 may include or employ various aspects disclosed herein. For example, server(s) 1204 may include or employ all or part of various systems and processes disclosed herein. It is noted that server(s) 1204 and client(s) 1202 may communicate via communication framework 1206. In an exemplary communication, client(s) 1202 and server(s) 1204 may utilize packeted data (e.g., data packets) adapted to be transmitted between two or more computers. For instance, data packets may include coded information associated with printing requests, orders, available printers, parameters associated with print-receptive media, or the likes.

Communication framework 1206 may comprise various network devices (e.g., access points, routers, base stations, etc.) that may facilitate communication between client(s) 1202 and server(s) 1204. It is noted that various forms of communications may be utilized, such as wired (e.g., optical fiber, twisted copper wire, etc.) and/or wireless (e.g., cellular, Wi-Fi, NFC, etc.) communications.

In various embodiments, client(s) 1202 and server(s) 1204 may respectively include or communicate with one or more client data store(s) 1220 or one or more server data store(s) 1210. The data stores may store data local to client(s) 1202 or server(s) 1204.

In at least one embodiment, a client of client(s) 1202 may transfer data describing a print order, user account data, printer device data, or the likes to a server of server(s) 1204. The server may store the data and/or employ processes to alter the data. For example, the server may transmit the data to other clients of client(s) 1202.

FIG. 13 is a block diagram of a computer system 1300 that may be employed to execute various disclosed embodiments. It is noted that various components may be implemented in combination with computer executable instructions, hardware devices, and/or combinations of hardware and software devices that may be performed by computer 1300.

Computer 1300 may include various components, hardware devices, software, software in execution, and the like. In embodiments, computer 1300 may include computer 1300. Computer 1300 may include a system bus 1308 that couples various system components. Such components may include a processing unit(s) 1304, system memory device(s) 1306, disk storage device(s) 1314, sensor(s) 1335, output adapter(s) 1334, interface port(s) 1330, and communication connection(s) 1344. One or more of the various components may be employed to perform aspects or embodiments disclosed herein. In an aspect, the computer system 1300 may "learn," such as described above user preferences based upon modifications of designs, feedback associated with satisfaction, or the like.

Processing unit(s) 1304 may comprise various hardware processing devices, such as single-core or multi-core processing devices. Moreover, processing unit(s) 1304 may refer to a "processor," "controller," "computing processing unit (CPU)," or the likes. Such terms generally relate to a hardware device. Additionally, processing unit(s) 1304 may include an integrated circuit, an application-specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or the like.

System memory 1306 may include one or more types of memory, such volatile memory 1310 (e.g., random access memory (RAM)) and non-volatile memory 1312 (e.g., read-only memory (ROM)). ROM may include erasable programmable ROM (EPROM), electrically erasable programmable ROM (EEPROM). In various embodiments, processing unit(s) 1304 may execute computer executable instructions stored in system memory 1306, such as operating system instructions and the likes.

Computer 1302 may also be one or more hard drive(s) 1314 (e.g., EIDE, SATA). While hard drive(s) 1314 are depicted as internal to computer 1302, it is noted that hard drive(s) 1314 may be external and/or coupled to computer 1302 via remote connections. Moreover, input port(s) 1330 may include interfaces for coupling to input device(s) 1328, such as disk drives. Disk drives may include components configured to receive, read and/or write to various types of memory devices, such as magnetic disks, optical disks (e.g., compact disks and/or other optical media), flash memory, zip drives, magnetic tapes, and the likes.

It is noted that hard drive(s) 1314 and/or other disk drives (or non-transitory memory devices in general) may store data and/or computer-executable instructions according to various described embodiments. Such memory devices may also include computer-executable instructions associated with various other programs or modules. For instance, hard drives(s) 1314 may include operating system modules, application program modules, and the likes. Moreover, disclosed aspects are not limited to a particular operating system, such as a commercially available operating system.

Input device(s) 1328 may also include various user interface devices or other input devices, such as sensors (e.g., microphones, pressure sensors, light sensors, etc.), scales, cameras, scanners, facsimile machines, and the likes. A user interface device may generate instructions associated with user commands. Such instructions may be received by computer 1302. Examples of such interface devices include a keyboard, mouse (e.g., pointing device), joystick, remote controller, gaming controller, touch screen, stylus, and the likes. Input port(s) 1330 may provide connections for the input device(s) 1328, such as via universal serial ports USB ports), infrared (IR) sensors, serial ports, parallel ports, wireless connections, specialized ports, and the likes.

Output adapter(s) 1334 may include various devices and/or programs that interface with output device(s) 1336. Such output device(s) 1336 may include LEDs, computer monitors, touch screens, televisions, projectors, audio devices, printing devices, or the likes.

In embodiments, computer 1302 may be utilized as a client and/or a server device. As such, computer 1302 may include communication connection(s) 1344 for connecting to a communication framework 1342. Communication connection(s) 1344 may include devices or components capable of connecting to a network. For instance, communication connection(s) 1344 may include cellular antennas, wireless antennas, wired connections, and the likes. Such communication connection(s) 1344 may connect to networks via communication framework 1342. The networks may include wide area networks, local area networks, facility or enterprise wide networks (e.g., intranet), global networks (e.g., Internet), satellite networks, and the likes. Some examples of wireless networks include Wi-Fi, Wi-Fi direct, BLUETOOTH™, Zigbee, and other 802.XX wireless technologies. It is noted that communication framework 1342 may include multiple networks connected together. For instance, a Wi-Fi network may be connected to a wired Ethernet network.

The terms "component," "module," "system," "interface," "platform," "service," "framework," "connector," "controller," or the like are generally intended to refer to a computer-related entity. Such terms may refer to at least one of hardware, software, or software in execution. For example, a component may include a computer process running on a processor, a processor, a device, a process, a computer thread, or the likes. In another aspect, such terms may include both an application running on a processor and a processor. Moreover, such terms may be localized to one computer and/or may be distributed across multiple computers.

What has been described above includes examples of the present specification. It is, of course, not possible to describe every conceivable combination of components or methodologies for purposes of describing the present specification, but one of ordinary skill in the art may recognize that many further combinations and permutations of the present specification are possible. Each of the components described above may be combined or added together in any permutation to define the described systems. Accordingly, the present specification is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The foregoing descriptions of exemplary embodiments of the present teachings have been presented for purposes of enablement, illustration, and description. They are not intended to be exhaustive of or to limit the present disclosure to the precise forms discussed. Many modifications and variations of the present disclosure are possible in light of the above teachings. Completed customization projects may be printed either remotely, such as at a factory remote from the user's location, or locally, such as at the user's personal printer. Also, the present disclosure is not limited to use across the Internet. Rather, the disclosure may be utilized over any computer communications network, including an internal, secure network. Further, although one feature of the disclosure is to enable customization of products without requiring a user to download software for performing the customization, it is anticipated that systems of the present disclosure may be employed and practiced on a local machine, without communicating across a network.

What is claimed is:

1. A printer system comprising:
    a processor coupled to a memory storing computer-executable instructions, the processor executes or facilitates execution of the computer-executable instructions to perform operations comprising:
       generating a customized design as a function of at least a user input and a print-receptive medium for receiving the customized design, wherein the customized design operatively identifies locations for printing first indicia on the print receptive medium during a first printing process; and
       generating a custom template for a secondary printing process of second indicia based on the customized design, wherein generating the custom template includes:
          identifying the locations of the first indicia associated with the customized design;
          determining restrictions for locating the second indicia based on the locations for printing the first indicia; and
          identifying safe print areas for the second indicia based on the determined restrictions.

2. The printer system of claim 1, wherein determining the restrictions for locating the second indicia based on the locations for printing the first indicia further comprises identifying bleed areas that define locations in which operative printing of the secondary indicia may result in bleeding of the second indicia into the first indicia.

3. The printer system of claim 1, wherein determining the restrictions for locating the second indicia based on the locations for printing the first indicia further comprises identifying bleed areas that define locations in which operative printing of the secondary indicia may result in cutting of the second indicia during the secondary printing process.

4. The printer system of claim 1, wherein determining the restrictions for locating the second indicia based on the locations for printing the first indicia further comprises determining one or more borders identifying locations in which the second indicia will not be operatively printed on the print receptive medium.

5. The printer system of claim 1, wherein the operations further comprise receiving input identifying the desired location of the second indicia and comparing the desired location with the safe print area.

6. The printer system of claim 5, wherein the operations further generating at least one notification in response to determining that the desired location of the second indicia is at least partially not within the safe area.

7. The printer system of claim 6, wherein the operations further comprise providing a user selectable control to allow a user to modify the desired location in response to the at least one notification.

8. The printer system of claim 6, wherein the operations further comprise providing a user selectable control to allow a user to proceed with the secondary printing process without the desired location in response to the at least one notification.

9. The printer system of claim 6, wherein the at least one notification comprises instructions for correcting the desired location.

10. A method, comprising:
    generating a customized design as a function of at least a user input and a print-receptive medium for receiving the customized design, wherein the customized design operatively identifies locations for printing first indicia on the print receptive medium during a first printing process;
    printing the customized design on the print receptive medium;
    generating a custom template for a secondary printing process of second indicia onto the print receptive medium based on at least the customized design, wherein generating the custom template includes:
       identifying the locations of the first indicia associated with the customized design;
       determining restrictions for locating the second indicia based on the locations for printing the first indicia; and
       identifying safe print areas for the second indicia based on the determined restrictions such that the secondary indicia does not interfere with the first indicia when the secondary printing process is executed.

11. The method of claim 10, wherein the first printing process is to be executed prior to the second printing process.

12. The method of claim 10, wherein the first printing process is executed via a remote printer and shipped to a user's location.

13. The method of claim 12, wherein the second printing process is executed via a user printer.

14. The method of claim 10, further comprising storing the custom template and associating the custom template with a user account.

15. A printer system comprising:
a processor coupled to a memory storing computer-executable instructions, the processor executes or facilitates execution of the computer-executable instructions to perform operations comprising:
generating a customized design comprising first indicia and defining locations of the first indicia relative a print receptive medium, safe print areas for receiving second indicia on the print receptive medium, and restricted print areas associated with restricting printing of the second indicia; and
generating a first custom template for a secondary printing process of the second indicia for printing on the print receptive medium after operative printing of the customized design, wherein the custom template indicates the safe print areas and the restricted print areas.

16. The printer system of claim 15, wherein the operations further comprise generating a second custom template for a third printing process of third indicia onto the print receptive medium.

17. The printer system of claim 15, wherein defining the locations further comprises defining the location of at least one of the safe print areas or the restricted print areas based on a characteristic of the print receptive medium.

18. The printer system of claim 17, wherein the characteristic of the print receptive medium further comprises at least one of a cut area, number of printable products, or type of card stock.

19. The printer system of claim 15, wherein the operations further comprise automatically determining a location for the second indicia based at least on the safe print areas and the restricted print areas.

* * * * *